3,432,206
WHEEL COVER
Edward G. Spisak, Wayne, Mich., assignor to Gar Wood Industries, Inc., Ypsilanti, Mich., a corporation of Michigan
Filed Dec. 19, 1966, Ser. No. 602,632
U.S. Cl. 301—37
Int. Cl. B60b 7/00; B60r 13/00, 19/00
1 Claim

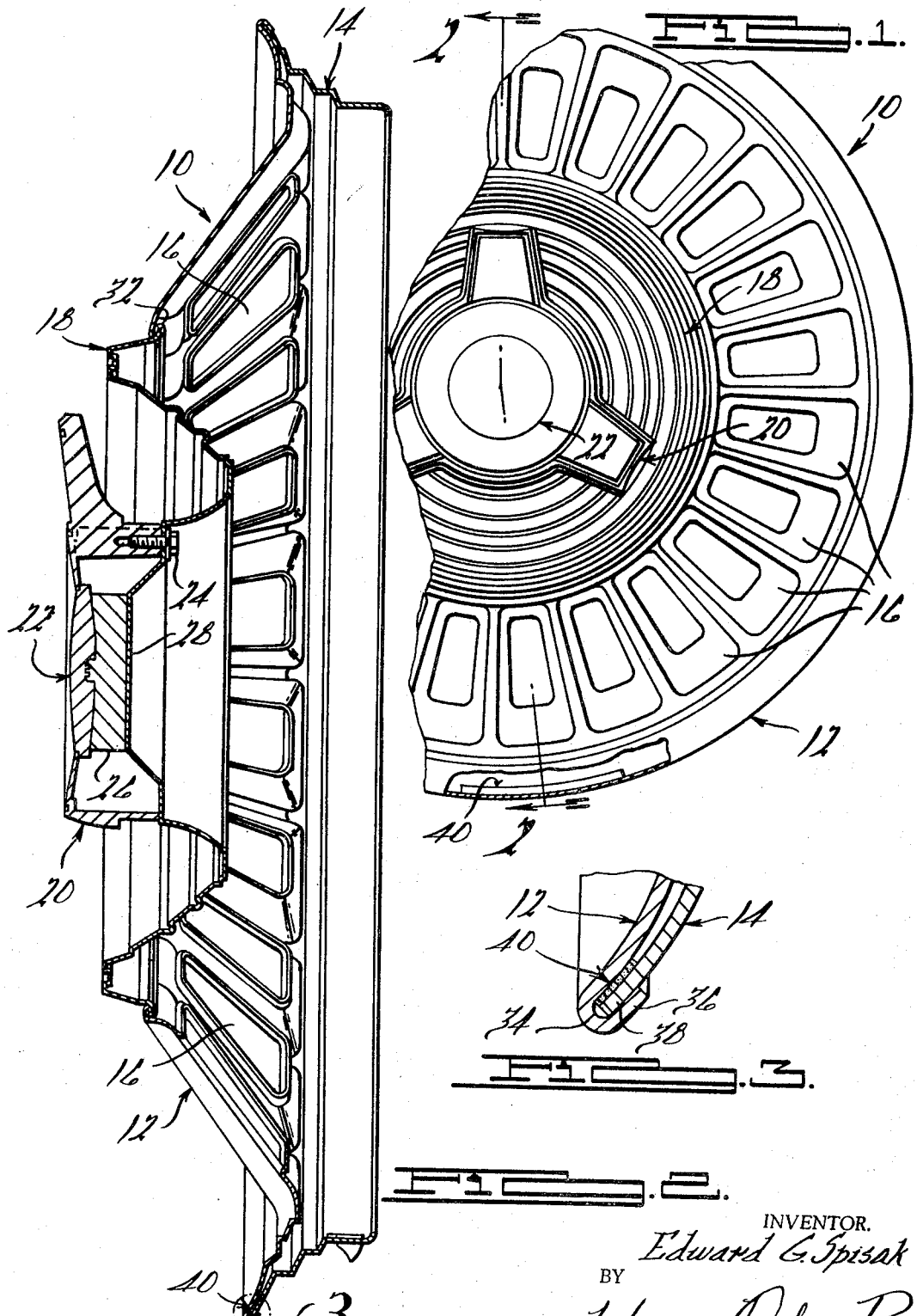
March 11, 1969 — E. G. SPISAK — 3,432,206
WHEEL COVER
Filed Dec. 19, 1966
INVENTOR.
Edward G. Spisak
BY Harness, Dickey & Pierce
ATTORNEYS United States Patent Office 3,432,206
Patented Mar. 11, 1969

ABSTRACT OF THE DISCLOSURE

A wheel cover embodying an improved means for securing the various component parts thereof against relative indexing movement. The means for preventing anti-indexing movement comprises a strip of resilient elastomeric material which is interposed and clamped within a U-shaped channel in one cover part and a peripheral edge of another cover part.

---

This invention relates generally to decorative covers for the wheels of motor vehicles and, more particularly, to a wheel cover embodying a new and improved means for securing the various component parts thereof against relative indexing movement.

In the construction of decorative wheel covers for motor vehicle wheels, it is necessary to secure the various component parts thereof, for example, centrally located parts and radially outwardly located rim parts, in a manner so as to prevent any relative indexing movement of these parts which may result in adversely affecting the appearance of the wheel covers, and may possibly result in shearing the valve stems of the associated tires. Such means for securing the various parts of vehicle wheel covers against indexing movement must be sufficiently durable to prevent failure at some future time, yet such means must be relatively inexpensive in accordance with the requirements of modern mass production techniques.

A wheel cover in accordance with the principles of the present invention exhibits improved anti-indexing characteristics between the various parts thereof through the provision of a novel anti-indexing means which is extremely effective in operation, is resistant to moisture exposure, high frequency vibrations and extreme temperature conditions, and is of an economical construction.

It is, therefore, a primary object of the present invention to provide a new and improved decorative wheel cover adapted to be applied to the face of the wheels of a motor vehicle.

It is a more particular object of the present invention to provide a wheel cover of the above character which is provided with improved means for preventing any relative indexing movement between the various component parts thereof.

It is a further object of the present invention to provide a new and improved wheel cover of the above character wherein the anti-indexing means functions to positively prevent any relative indexing of the component parts of the wheel cover under the most extreme operating conditions.

It is still another object of the present invention to provide a new and improved wheel cover of the above character which is of a relatively simple design, is easy to assemble and economical to commercially manufacture.

Other objects and advantages of the present invention will become apparent from the following detailed description, taken in conjunction with the accompanying drawing, wherein:

FIGURE 1 is a fragmentary side elevational view of a wheel cover in accordance with an exemplary embodiment of the present invention;

FIGURE 2 is an enlarged fragmentary cross-sectional view, partially broken away, of the wheel cover illustrated in FIGURE 1, as taken substantially along the line 2—2 thereof, and FIGURE 3 is an enlarged fragmentary view of a portion of the wheel cover illustrated within the circle 3 of FIGURE 2.

For convenience of description, the terms "axially inner," "axially outer" and words of similar import will have reference to the wheel cover of the present invention hereinafter described in detail, with the axially outer side of the subject wheel cover being at the left side of FIGURE 2. Likewise, the terms "radially inner," "radially outer," and derivatives thereof will have reference to a geometric center of the wheel cover of the present invention and the various component parts thereof.

Referring now to the drawing, a vehicle wheel cover assembly 10, in accordance with an exemplary embodiment of the present invention, is shown as comprising an annular main wheel cover member 12 which is fixedly secured to a retaining or mounting ring 14. As is well known in the art, the ring 14 functions to detachably secure the wheel cover assembly 10 to an associated vehicle wheel (not shown). The cover member 12 may be of any desired decorative appearance and in the exemplary embodiment illustrated herein, is provided with a plurality of circumferentially spaced, radially extending indentations or facets, generally designated 16. The assembly 10 also comprises a central hub member 18 which, for purpose of decoration, may be provided with a central "spinner" 20 having a centrally located medallion 22 and is adapted to be secured to the axially outer side of the hub member 18 by means of suitable screws, bolts or the like 24. Suitable gasket means 26 is provided interjacent the outer side of a central outwardly extending section 28 of the hub member 18 and the inner side of the medallion 22. The hub member 18, like the cover member 12, may be provided with any desired decoration and is fixedly secured to the cover member 12 by means of having an inner peripheral flange portion 32 thereof crimped or similarly formed radially inwardly around the outer peripheral edge of the hub member 18.

The cover member 12 is adapted to be fixedly secured to the mounting ring 14 in a manner so as to minimize to the extreme, the possibility of any relative indexing movement between the members 12 and 14. In general, the members 12 and 14 are adapted to be fixedly secured to each other by having an outer peripheral edge of the cover member 12 crimped radially and axially inwardly over the outer peripheral edge of the rim member 14, as best seen in FIGURE 3. More particularly, the outer peripheral edge of the cover member 12 is formed with an axially inwardly extending section 34 which terminates at its axially innermost portion in an axially and radially inwardly extending flange section 36, the sections 34 and 36 providing a generally U-shaped channel within which the outer peripheral edge portion 38 of the rim member 14 is adapted to be clampingly secured, as best seen in FIGURE 3. In accordance with the principles of the present invention, in order to positively provide against any relative indexing movement between the rim member 14 and cover member 12, an anti-indexing member 40 is interposed between the radially outer side of the rim portion 38 and the axially inner side of the cover member adjacent the section 34 thereof. The anti-indexing member 40 is preferably formed of a resilient or elastomeric material which is of a relatively tough sponge or rubber-like consistency. The material is preferably moisture and salt resistant and is also resistant to high frequency vibration without flowing or deteriorating. Although the member 40 can be constructed of a wide variety of different materials, one preferable material is manufactured and distributed by Minnesota Mining & Manufacturing Company and designated by the product number EC–1055. This material is an oil base elastomer which is resistant to temperatures up to 300° without flowing and remains relatively flexible down to a temperature of approximately 40° F.

The anti-indexing member 40 is preferably initially provided in the form of an elongated strip which may be cut off to desired lengths and be inserted between the adjacent portions of the wheel cover members 12 and 14 preparatory to the members 12 and 14 being finally assembled. It has been found that positive anti-indexing characteristics are achieved through the provision of only a single anti-indexing member 40 which may be in the order of 2 to 3 inches in length. It will be apparent, of course, two or more such members 40 may be used in various wheel cover constructions. Upon assembly of the wheel cover 10, the anti-indexing member 40 is compressed tightly between the rim portion 38 and the adjacent portion of the cover member 12, with the result that the anti-indexing member 40 is maintained under a state of compression which positively prevents any relative indexing movement between the members 12 and 14 through the operative life of the wheel cover 10.

The primary advantage of the wheel cover constructed in accordance with the principles of the present invention resides in the fact that through the provisions of the anti-indexing member 40, certain manufacturing operations, such as stamping, bulging and similar types of operations may be eliminated, thus reducing the manufacturing time and attendant expenses of the wheel cover. Accordingly, the present invention provides a wheel cover construction which not only exhibits improved anti-indexing characteristics, but a wheel cover which is also more economical to commercially manufacture.

It will be apparent, of course, that the principles of the present invention are not limited in scope to the particular wheel cover described and illustrated herein, and that the principles herein described will find particularly useful application in a great number of other types of wheel cover constructions.

While it will be apparent that the exemplary embodiment illustrated herein is well calculated to fulfill the objects above stated, it will be appreciated that the wheel cover assembly 10 of the present invention is susceptible to modification.

What is claimed is:
1. In a wheel cover assembly,
   an annular wheel cover member,
   a retaining rim member extending around the outer periphery of said wheel cover member and adapted to detachably secure the same to an associated vehicle wheel or the like,
   one of said members having a generally radially projecting peripheral section,
   the other of said members having a peripheral section disposed adjacent said first mentioned section and comprising a reentrantly radially projecting portion defining a circumferentially extending channel adapted to nestingly receive and clampingly engage said first mentioned peripheral section, whereby to secure said members in a unitized assembly, and
   an anti-indexing member clampingly secured between said peripheral sections of said members,
   said anti-indexing member extending only partially circumferentially around the juncture of said members and being fabricated of a resilient elastomeric material and maintained under a state of compression between said peripheral sections of said members, whereby to positively assure against any relative indexing movement between said members.

References Cited
UNITED STATES PATENTS
2,016,395 10/1935 Sinclair _____ 301—37
2,444,053 6/1948 Lyon _____ 301—37
3,095,241 6/1963 Fitzgerald _____ 301—37

RICHARD J. JOHNSON, *Primary Examiner.*